US007711189B2

(12) United States Patent
Katsuyama et al.

(10) Patent No.: US 7,711,189 B2
(45) Date of Patent: May 4, 2010

(54) LAYOUT ANALYSIS PROGRAM, LAYOUT ANALYSIS APPARATUS AND LAYOUT ANALYSIS METHOD

(75) Inventors: Yutaka Katsuyama, Kawasaki (JP); Hiroaki Takebe, Kawasaki (JP); Koji Kurokawa, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1067 days.

(21) Appl. No.: 11/384,327

(22) Filed: Mar. 21, 2006

(65) Prior Publication Data

US 2007/0140560 A1 Jun. 21, 2007

(30) Foreign Application Priority Data

Dec. 20, 2005 (JP) ............................. 2005-366466

(51) Int. Cl.
  *G06K 9/34* (2006.01)
  *G06K 9/46* (2006.01)
  *G06K 9/00* (2006.01)
(52) U.S. Cl. ....................................... 382/176; 382/190
(58) Field of Classification Search ................. 382/164, 382/173, 174, 176, 178, 181, 190, 257, 298, 382/299; 358/1.9
  See application file for complete search history.

(56) References Cited

U.S. PATENT DOCUMENTS

| | | | | |
|---|---|---|---|---|
| 4,573,201 A * | 2/1986 | Hashiyama et al. | ......... | 382/242 |
| 5,091,964 A * | 2/1992 | Shimomura | .................. | 382/174 |
| 5,181,255 A * | 1/1993 | Bloomberg | .................. | 382/176 |
| 5,640,466 A * | 6/1997 | Huttenlocher et al. | ....... | 382/177 |
| 5,680,478 A * | 10/1997 | Wang et al. | .................. | 382/176 |
| 5,809,167 A * | 9/1998 | Al-Hussein | .................. | 382/190 |
| 5,848,184 A * | 12/1998 | Taylor et al. | ................. | 382/173 |
| 5,872,864 A * | 2/1999 | Imade et al. | ................. | 382/176 |
| 6,160,913 A * | 12/2000 | Lee et al. | ..................... | 382/176 |
| 6,327,382 B1 * | 12/2001 | Kaneda et al. | ............. | 382/164 |
| 6,360,009 B2 * | 3/2002 | Li et al. | ..................... | 382/176 |
| 6,373,981 B1 * | 4/2002 | de Queiroz et al. | ......... | 382/176 |
| 6,941,014 B2 * | 9/2005 | Lin et al. | ..................... | 382/176 |
| 2007/0140560 A1 * | 6/2007 | Katsuyama et al. | ......... | 382/176 |

FOREIGN PATENT DOCUMENTS

JP          2001-43312          2/2001

* cited by examiner

*Primary Examiner*—Amir Alavi
(74) *Attorney, Agent, or Firm*—Staas & Halsey LLP

(57) ABSTRACT

A layout analysis program, a layout analysis apparatus, layout analysis method and a medium can highly accurately extract a text block from an image if the image is a color image. The layout analysis program causes a computer to execute a divided region extracting step that extracts a region partitioned by a pattern according to a binary image so as to use the outcome of extraction as divided region, a set of character elements extracting step that extracts a set of the character elements extracted by a first binary image layout analysis process for each extracted divided region so as to use the outcome of extraction as set of character elements, a text block extracting step that extracts a region including the extracted set of character elements in each divided region so as to avoid overlapping the non-character elements extracted by a second binary image layout analysis process and use the outcome of extraction as text block and a layout information generating step that generates layout information according to the text block and the non-character elements extracted by the second binary image layout analysis process.

19 Claims, 15 Drawing Sheets

FIG.8

RECTANGULAR DIVIDED REGION 0

RECTANGULAR DIVIDED REGION 1

RECTANGULAR DIVIDED REGION 2

RECTANGULAR DIVIDED REGION 3

RECTANGULAR DIVIDED REGION 4

RECTANGULAR DIVIDED REGION 5

LAYOUT ANALYSIS PROGRAM, LAYOUT ANALYSIS APPARATUS AND LAYOUT ANALYSIS METHOD

BACKGROUND OF THE INVENTION

1. Field of the Invention

This invention relates to a layout analysis program, a layout analysis apparatus, a layout analysis method and a medium for extracting a text block or the like from an image.

2. Description of the Related Art

An OCR (optical character reader) can recognize the layout of an image of a document and the characters in one or more than one character regions of the image that is read out typically by means of a scanner. In recent years, OCR applications and document management systems for storing, retrieving and/or reusing ordinary documents and other documents have been attracting attention. Most recently, OCRs have been required to scan not only black and white documents but also color documents typically by the provisions of the requirements in the e-document law.

In the field of the OCR technology for color images, related processes are executed by following the sequence as shown below.

1. Layout analysis process

2. Binarization process

3. Character recognition process in a character region

Of the above listed three processes, the layout analysis process tends to be less accurate if compared with the remaining two processes. Furthermore, this tendency is particularly remarkable when the layout analysis process is executed on a color image.

Now, the configuration of a known layout analysis apparatus for analyzing the layout of a color image will be discussed below as an example. FIG. 17 is a schematic block diagram of the known layout analysis apparatus for analyzing the layout of a color image, showing its configuration. The layout analysis apparatus comprises an image acquiring section 101, a NiblackDeltaGNoiseRemoveFast binarizing section 102, a binary image layout analyzing section 103, a text block dividing section 104, a text block reconfiguring section 105 and a layout information generating section 106.

Now, the operation of the known layout analysis apparatus for analyzing the layout of a color image will be described below. Firstly, the image acquiring section 101 acquires a color image. Then, the NiblackDeltaGNoiseRemoveFast binarizing section 102 executes a NiblackDeltaGNoiseRemoveFast binarization process, which is based on the Niblack binarization process, on the acquired color image. Thereafter, the binary image layout analyzing section 103 executes a binary image layout analysis process, which is a layout analysis process for binary images. The technique described in Patent Document 1 [Jpn. Pat. Appln. Laid-Open Publication No. 11-219407] is used here for the binary image layout analysis process. As a result, text blocks, which contain character elements, and graphic separator blocks (picture regions, table regions, separators, frame regions), which contain non-character elements, are extracted.

The text block dividing section 104 then divides each of the text blocks. This process is executed because the columns in a page of a newspaper may not be extracted properly and two or more than two columns may be extracted collectively as a column. In this dividing process, a histogram is generated for the periodicity of black pixels prepared by projecting the black pixels in a text block vertically and horizontally and the positions to be used for the division are determined on the basis of the histogram.

Thereafter, the text block reconfiguring section 105 reconfigures the text blocks by coordinating two adjacent text blocks when the top and bottom coordinates and the left end and right end coordinates of the adjacent text blocks are located close to each other. Subsequently, the layout information generating section 106 outputs the obtained text blocks and the graphic separator blocks as layout information to end the layout analysis.

Patent Document 2 [Jpn. Pat. Appln. Laid-Open Publication No. 2001-184511] describes an image processing apparatus, an image processing system, an image processing method and a storage medium adapted to acquire a plurality of binary images from a multilevel image that is an original image, extract regions containing aggregates of block pixels from the plurality of binary images, divide the regions according to the crowded condition of starting pixels and ending pixels of each aggregate of black pixels and identify the attributes (characters, pictures, etc.) of each of the regions produced by the division on the basis of the histogram of the original image in each of the regions produced by the division.

Patent Document 3 [PCT Republication No. 00/62243] describes an apparatus and a method for extracting a character string according to the basic components of a document image adapted to extract basic components of a document image which may be a binary image, a multiple image, a color image or some other image and determine if each component is a character component or not by using the relation of inclusion among the basic components. Then, a set of character components is extracted according to the outcome of the determination and strings of characters are extracted from the set of character components. Thereafter, the binary image generating section of the character string extracting apparatus binarizes the lightness component of each pixel according to a predetermined threshold value and generates a binary image that is constituted by pixels having either a value that corresponds to a drawn region or a value that corresponds to a background region. Additionally, the binary image generating section highly accurately extracts character patterns, although it cannot reliably extract picture patterns and table patterns. Each character part of white characters on a black background is reversed and extracted as a character part of black characters on a white background.

However, among the above-described known layout analysis techniques, the one adapted to use only a single binarization method cannot extract both characters and graphics highly accurately. Additionally, it cannot cope with a plurality of background colors and white characters in a character region. For example, while the above described NiblackDeltaGNoiseRemoveFast binarization process can hold the continuity of ruled lines, it cannot extract while characters on a black background. Additionally, it sometimes cannot extract a text block correctly when characters and pictures are arranged close to each other because they can easily contact with each other.

Techniques for extracting a character region by means of a histogram of a multilevel image like the one disclosed in Patent Document 2 cannot provide a high degree of accuracy. Generally, a character region extracted from a binary image is more accurate than a character region extracted from a multilevel (gradated) image. Additionally, the technique of Patent Document 2 detects regions from a plurality of binary images but, when generating a histogram of an original image for the larger region of two regions that show a relation of complete inclusion, it only uses a relation of excluding the smaller region.

SUMMARY OF THE INVENTION

In view of the above-identified problems of the prior art, it is therefore the object of the present invention to provide a layout analysis program, a layout analysis apparatus, layout analysis method and a medium for highly accurately extracting a text block from an image if the image is a color image.

In an aspect of the present invention, the above object is achieved by providing a layout analysis program for causing a computer to analyze the layout of an image, the program comprising: a divided region extracting step that extracts a region partitioned by a pattern according to a binary image so as to use the outcome of extraction as divided region; a set of character elements extracting step that extracts a set of the character elements extracted by a first binary image layout analysis process for each divided region extracted in the divided region extracting step so as to use the outcome of extraction as set of character elements; a text block extracting step that extracts a region including the set of character elements extracted in the set of character elements extracting step in each divided region so as to avoid overlapping the non-character elements extracted by a second binary image layout analysis process and use the outcome of extraction as text block; and a layout information generating step that generates layout information according to the text block extracted in the text block extracting step and the non-character elements extracted by the second binary image layout analysis process.

In a layout analysis program according to the invention, the set of character elements extracting step is adapted to additionally include the character elements included in the non-character elements extracted by the first binary image layout analysis process out of the character elements extracted by the second binary image layout analysis process in the set of character elements.

In a layout analysis program according to the invention, the text block extracting step is adapted to additionally extract a separator in each divided regions extracted in the divided region extracting step and then a region including the set of character elements extracted in the set of character elements extracting step in each divided region so as to avoid overlapping the separator and non-character elements extracted by the second binary image layout analysis process and use the outcome of extraction as text block.

In a layout analysis program according to the invention, the text block extracting step is adapted to additionally use the non-character elements as text block when it determines that the non-character elements extracted by the first binary image layout analysis process constitute a text block.

In a layout analysis program according to the invention, the text block extracting step is adapted to additionally determine if the non-character elements constitute a text block or not according to the periodicity of the vertical distribution of black pixels and the periodicity of the horizontal distribution of black pixels of the non-character elements extracted by the first binary image layout analysis process.

In a layout analysis program according to the invention, the first binary image layout analysis process shows a higher accuracy level for extraction of character elements than the second binary image layout analysis process.

In a layout analysis program according to the invention, the first binary image layout analysis process is for executing a first binarization process on an original image that is a color image and performing a layout analysis on the first binary image obtained by the binarization process, and the second binary image layout analysis process is for executing a second binarization process that is different from the first binarization process on the original image and performing a layout analysis on the second binary image obtained by the binarization process while the divided region extracting step is adapted to extract a divided region according to the second binary image.

In a layout analysis program according to the invention, the divided region extracting step is adapted to reverse the luminance of the second binary image, extract a region of linked black pixels from the reversed binary image obtained by the reversal and then rectangles circumscribing the region, select a rectangle satisfying predetermined requirements from the rectangles as rectangular divided region and use the region obtained by removing the rectangular divided region included in a rectangular divided region from the rectangular divided region as the divided region.

In a layout analysis program according to the invention, the first binary image layout analysis process is for performing a layout analysis on the original image that is a binary image, and the second binary image layout analysis process is for reversing the luminance of the original image and performing a layout analysis on the reversed binary image obtained by the reversal while the divided region extracting step is adapted to extract the divided region according to the reversed binary image.

In a layout analysis program according to the invention, the divided region extracting step is adapted to extract a region of linked black pixels from the reversed binary image obtained and then rectangles circumscribing the region, select a rectangle satisfying predetermined requirements from the rectangles as rectangular divided region and use the region obtained by removing the rectangular divided region included in a rectangular divided region from the rectangular divided region as the divided region.

In a layout analysis program according to the invention, the character elements are character rectangles.

In another aspect of the present invention, there is provided a layout analysis apparatus for analyzing the layout of an image, the apparatus comprising: a divided region extracting section that extracts a region partitioned by a pattern according to a binary image so as to use the outcome of extraction as divided region; a set of character elements extracting section that extracts a set of the character elements extracted by a first binary image layout analysis process for each divided region extracted by the divided region extracting section so as to use the outcome of extraction as set of character elements; a text block extracting section that extracts a region including the set of character elements extracted by the set of character elements extracting section in each divided region so as to avoid overlapping the non-character elements extracted by a second binary image layout analysis process and use the outcome of extraction as text block; and a layout information generating section that generates layout information according to the text block extracted in the text block extracting step and the non-character elements extracted by the second binary image layout analysis process.

In a layout analysis apparatus according to the invention, the set of character elements extracting section is adapted to additionally include the character elements included in the non-character elements extracted by the first binary image layout analysis process out of the character elements extracted by the second binary image layout analysis process in the set of character elements.

In a layout analysis apparatus according to the invention, the text block extracting section is adapted to additionally extract a separator in each divided regions extracted by the divided region extracting section and then a region including the set of character elements extracted by the set of character elements extracting section in each divided region so as to avoid overlapping the separator and non-character elements extracted by the second binary image layout analysis process and use the outcome of extraction as text block.

In a layout analysis apparatus according to the invention, the text block extracting section is adapted to additionally use the non-character elements as text block when it determines that the non-character elements extracted by the first binary image layout analysis process constitute a text block.

In a layout analysis apparatus according to the invention, the text block extracting section is adapted to additionally determine if the non-character elements constitute a text block or not according to the periodicity of the vertical distribution of black pixels and the periodicity of the horizontal distribution of black pixels of the non-character elements extracted by the first binary image layout analysis process.

In a layout analysis apparatus according to the invention, the first binary image layout analysis process shows a higher accuracy level for extraction of character elements than the second binary image layout analysis process.

In a layout analysis apparatus according to the invention, the first binary image layout analysis process is for executing a first binarization process on an original image that is a color image and performing a layout analysis on the first binary image obtained by the binarization process, and the second binary image layout analysis process is for executing a second binarization process that is different from the first binarization process on the original image and performing a layout analysis on the second binary image obtained by the binarization process while the divided region extracting section is adapted to extract a divided region according to the second binary image.

In still another aspect of the present invention, there is provided a computer-readable recording medium having a layout analysis program recorded thereon, said program adapted to execute on a computer to analyze the layout of an image, the program comprising: a divided region extracting step that extracts a region partitioned by a pattern according to a binary image so as to use the outcome of extraction as divided region; a set of character elements extracting step that extracts a set of the character elements extracted by a first binary image layout analysis process for each divided region extracted in the divided region extracting step so as to use the outcome of extraction as set of character elements; a text block extracting step that extracts a region including the set of character elements extracted in the set of character elements extracting step in each divided region so as to avoid overlapping the non-character elements extracted by a second binary image layout analysis process and use the outcome of extraction as text block; and a layout information generating step that generates layout information according to the text block extracted in the text block extracting step and the non-character elements extracted by the second binary image layout analysis process.

In still another aspect of the present invention, there is provided a layout analysis method for analyzing the layout of an image, the method comprising: a divided region extracting step that extracts a region partitioned by a pattern according to a binary image so as to use the outcome of extraction as divided region; a set of character elements extracting step that extracts a set of the character elements extracted by a first binary image layout analysis process for each divided region extracted in the divided region extracting step so as to use the outcome of extraction as set of character elements; a text block extracting step that extracts a region including the set of character elements extracted in the set of character elements extracting step in each divided region so as to avoid overlapping the non-character elements extracted by a second binary image layout analysis process and use the outcome of extraction as text block; and a layout information generating step that generates layout information according to the text block extracted in the text block extracting step and the non-character elements extracted by the second binary image layout analysis process.

Thus, according to the present invention, it is possible to extract a text block highly accurately from an image if the image is a color image.

BRIEF DESCRIPTION OF THE DRAWINGS

FIG. 8 is a schematic illustration of an image, showing the operation of the independent divided region extracting section 53 of the embodiment of FIG. 1;

DETAILED DESCRIPTION OF THE PREFERRED EMBODIMENTS

Now, the present invention will be described in greater detail by referring to the accompanying drawings that illustrate a preferred embodiment of the invention.

The embodiment of the present invention that is described below is a layout analysis apparatus for analyzing the layout of a color image. The embodiment of layout analysis apparatus is adapted to analyze the layout of a color image that satisfies the requirements of the e-document law. In other words, the resolution [dpi], the character size, the document size and so on that appear in the following description respectively show values that satisfies the requirements of the e-document law.

Firstly, the configuration of the layout analysis apparatus of this embodiment will be described below.

Figure 1:
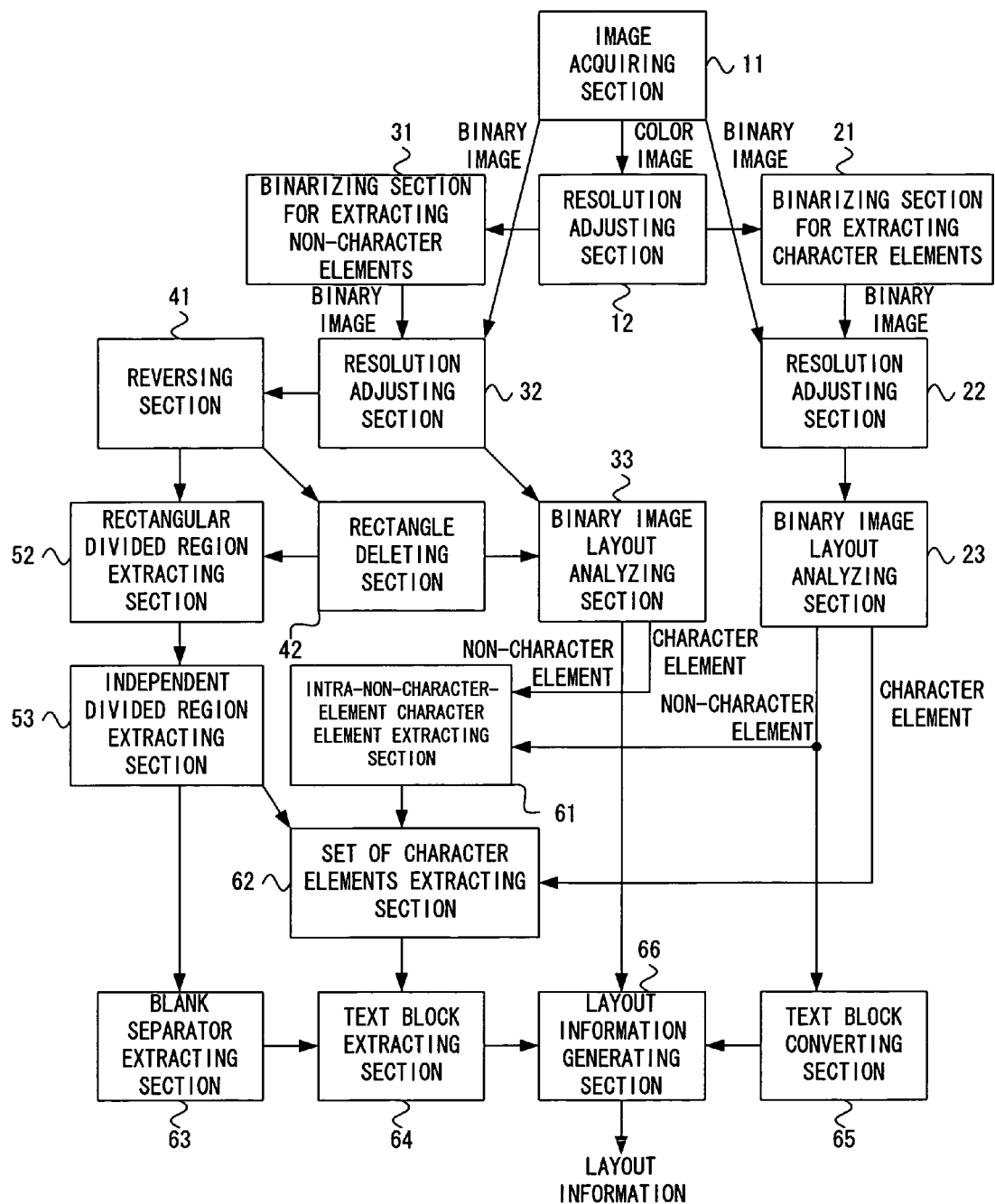
FIG. 1 is a schematic block diagram of an embodiment of layout analysis apparatus according to the invention, illustrating the configuration thereof.

FIG. 1 is a schematic block diagram of the layout analysis apparatus of this embodiment. Referring to FIG. 1, the layout analysis apparatus comprises an image acquiring section 11, a resolution adjusting section 12, a binarizing section for extracting character elements 21, a resolution adjusting section 22, a binary image layout analyzing section 23, a binarizing section for extracting non-character elements 31, a resolution adjusting section 32, a binary image layout analyzing section 33, a reversing section 41, a rectangle deleting section 42, a rectangular divided region extracting section 52, an independent divided region extracting section 53, an intra-non-character-element character element extracting section 61, a set of character elements extracting section 62, a blank separator extracting section 63, a text block extracting section 64, a text block converting section 65 and a layout information generating section 66.

Now, the operation of the above embodiment of layout analysis apparatus for analyzing the layout of a color image will be described below by way of an image obtained by an actual operation as example. The rectangle deleting section 42 is not necessary when analyzing the layout of a color image.

Figure 2:
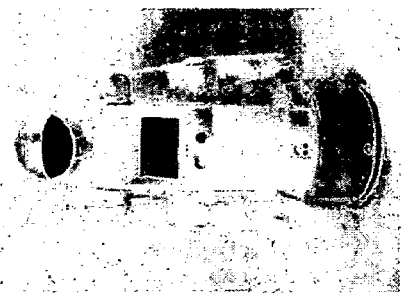
FIG. 2 is a schematic illustration of an image produced as output by the image acquiring section 11 of the embodiment of FIG. 1.

The image acquiring section 11 acquires a color image to be analyzed for the layout. FIG. 2 is a schematic illustration of an image produced as output by the image acquiring section 11 of this embodiment. More specifically, this image is an original image to be analyzed for the layout. When analyzing the layout of a color image, the image acquiring section 11 delivers the color image to the resolution adjusting section 12.

If the sheets of paper that are input have a size within a predetermined range (about A4 size), the image size varies depending on the reading resolution. In order to keep the resolution and size of the color image constant, the resolution adjusting section 12 reduces the size of the input color image when the resolution of the color image is higher than a predefined level. In this embodiment, the resolution adjusting section 12 performs a simple thinning/size-reducing operation so as to make the color image show a resolution between 150 and 250 dpi. The color image whose resolution is adjusted by the resolution adjusting section 12 is then delivered to the binarizing section for extracting character elements 21 and the binarizing section for extracting non-character elements 31. The color image normally contains both character elements and non-character elements. Both the binarizing section for extracting character elements 21 and the binarizing section for extracting non-character elements 31 can extract character elements and non-character elements. A character element is extracted as a character rectangle that circumscribes a character and a non-character element that may be a graph, a table or a separator is extracted as a rectangle that circumscribes it.

Figure 3:
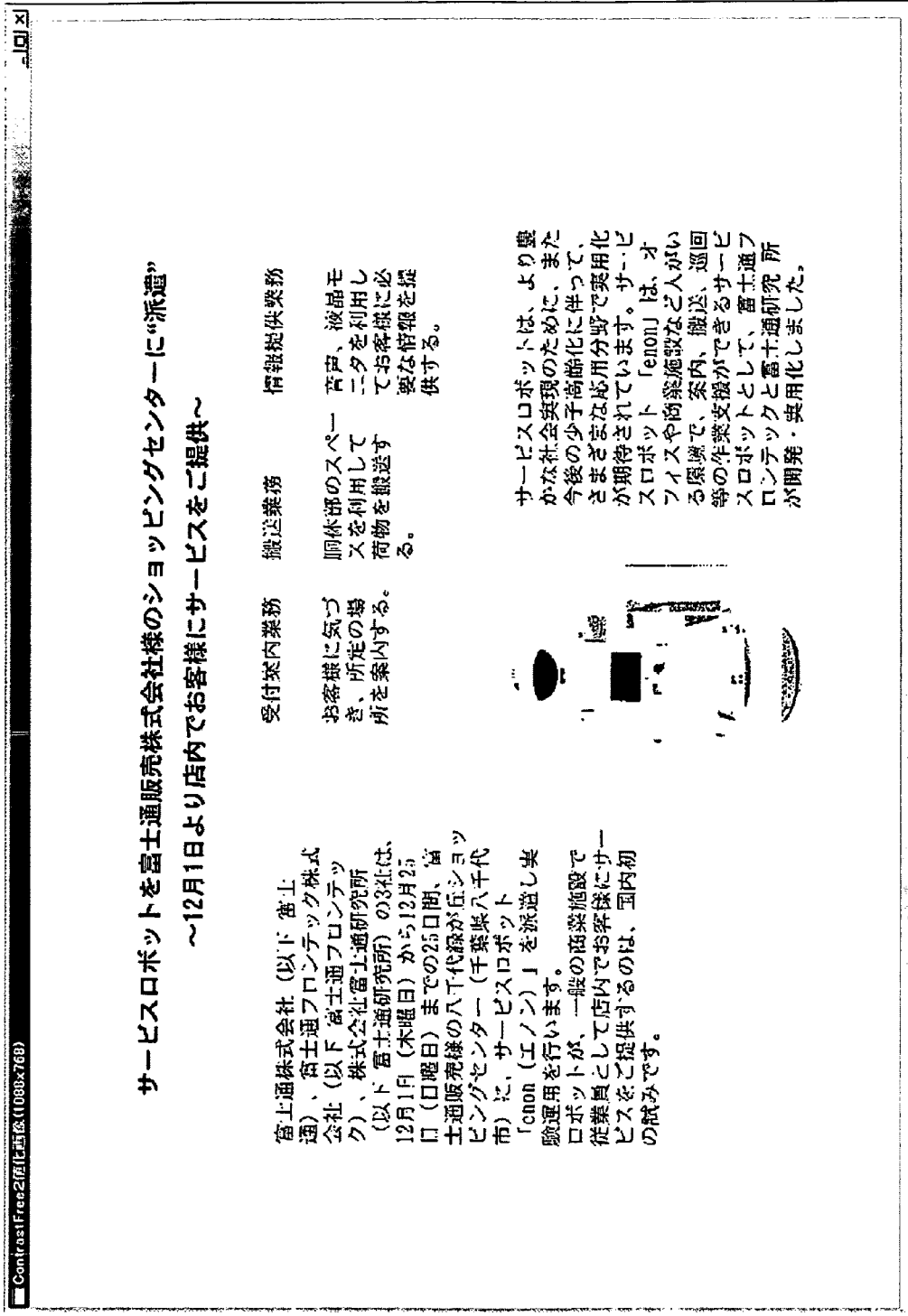
FIG. 3 is a schematic illustration of an image produced as output by the binarizing section for extracting character elements 21 of the embodiment of FIG. 1.

Then, the binarizing section for extracting character elements 21 executes a binarization process for extracting character elements that is a binarization process on the color image that is adjusted for resolution by the resolution adjusting section 12 as it is good at extracting character elements and generates a binary image for extracting a text block. Note that the technique that the binary image generating section uses as disclosed in Patent Document 3 is also used for the binarization process for extracting character elements in this embodiment. FIG. 3 is a schematic illustration of an image that can be produced as output by the binarizing section for extracting character elements 21 of this embodiment.

Figure 4:
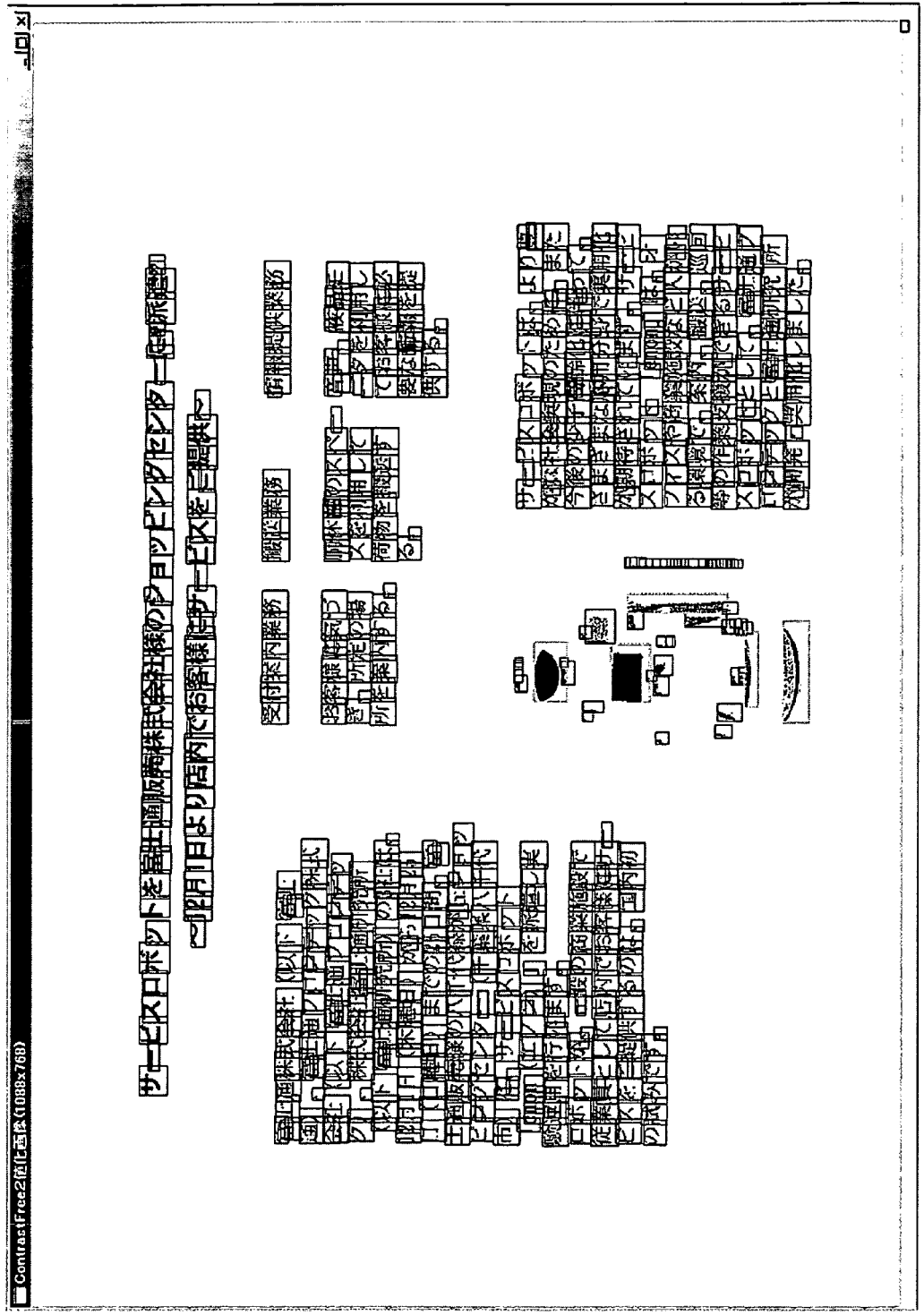
FIG. 4 is a schematic illustration of an image produced as output by the binary image layout analyzing section 23 of the embodiment of FIG. 1.

Then, the resolution adjusting section 22 adjusts the resolution of the binary image for extracting character elements obtained by the binarizing section for extracting character elements 21 to as to make it suitable for the downstream binary image layout analyzing section 23. In this embodiment, the resolution adjusting section 22 enlarge the binary image so as to make it show a resolution of about 400 dpi. Thereafter, the binary image layout analyzing section 23 executes a binary image layout analyzing process on the binary image for extracting character elements obtained by the resolution adjusting section 22. Note that the binary image layout analyzing process technique as disclosed in Patent Document 1 is used in this embodiment. Character elements and non-character elements are extracted by the binary image layout analyzing section 23 from the binary image for extracting character elements as so many rectangles and preserved separately. FIG. 4 is a schematic illustration of an image that can be produced as output by the binary image layout analyzing section 23 of this embodiment. It will be appreciated that character rectangles that are character elements are extracted particularly excellently in the image of FIG. 4.

Figure 5:
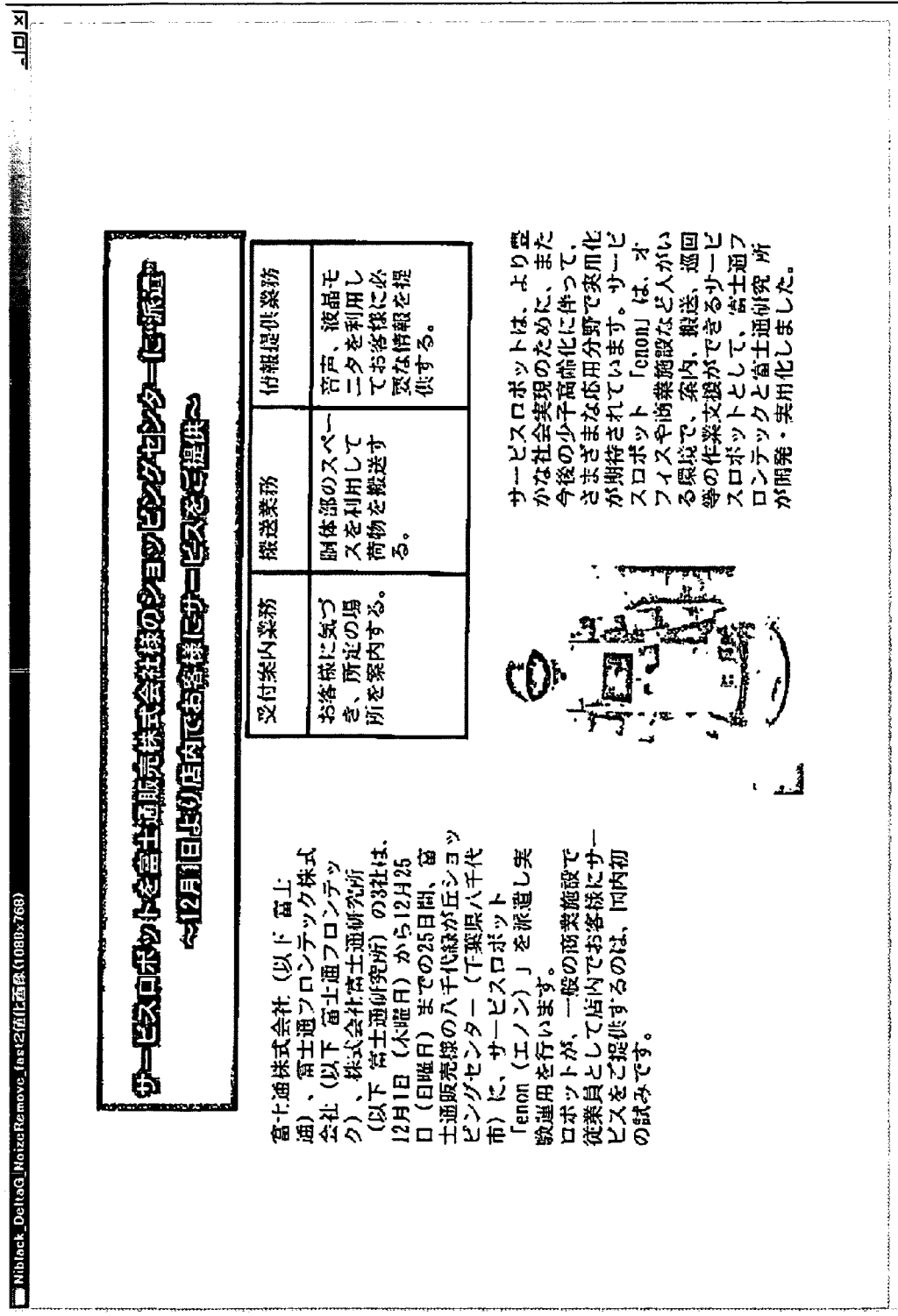
FIG. 5 is a schematic illustration of an image produced as output by the binarizing section for extracting non-character elements 31 of the embodiment of FIG. 1.

On the other hand, the binarizing section for extracting non-character elements 31 executes a binarization process for extracting non-character elements that is a binarization process on the color image that is adjusted for resolution by the resolution adjusting section 12 as it is good at extracting non-character elements and generates a binary image for extracting non-character elements. The binarization process for extracting non-character elements is a NiblackDeltaG-NoiseRemoveFast binarization process, which is described earlier. FIG. 5 is a schematic illustration of an image that can be produced as output by the binarizing section for extracting non-character elements 31 of this embodiment. Thus, the image is a binary image.

Figure 6:
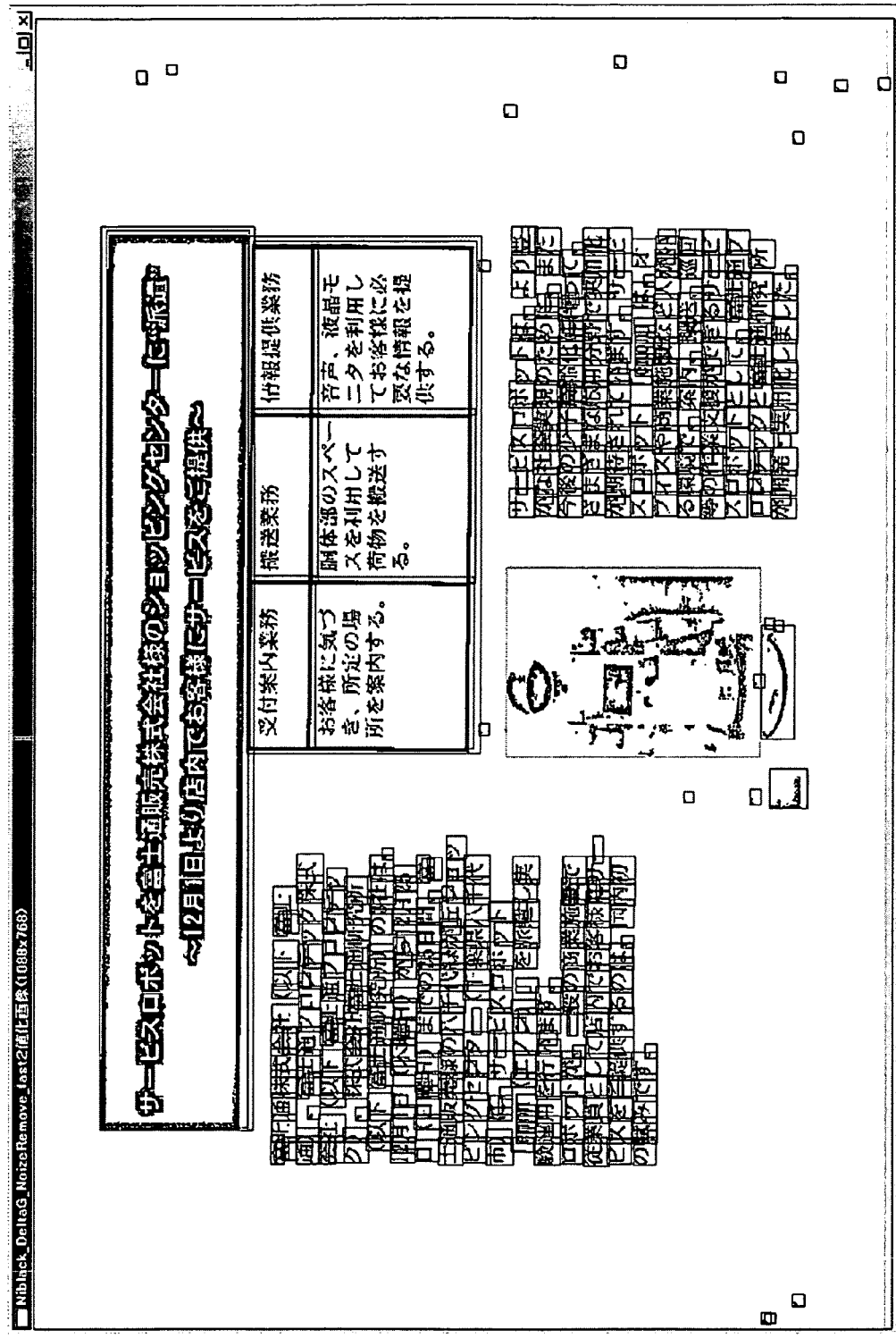
FIG. 6 is a schematic illustration of an image produced as output by the binary image layout analyzing section 33 of the embodiment of FIG. 1.

Thereafter, the resolution adjusting section 32 adjusts the resolution of the binary image for extracting non-character elements obtained by the binarizing section for extracting non-character elements 31 so as to make it suitable for the downstream binary image layout analyzing section 33. In this embodiment, the resolution adjusting section 32 enlarges the binary image so as to make it show a resolution of about 400 dpi like the resolution adjusting section 22. Thereafter, the binary image layout analyzing section 33 executes a binary image layout analyzing process on the binary image for extracting non-character elements obtained by the resolution adjusting section 32. Note that the binary image layout analyzing process technique as disclosed in Patent Document 1 is typically used by both the binary image layout analyzing section 23 and the binary image layout analyzing section 33 in this embodiment. Character elements and non-character elements are extracted from the binary image for extracting non-character elements and preserved separately. FIG. 6 is a schematic illustration of an image that can be produced as output by the binary image layout analyzing section 33 of this embodiment. It will be appreciated that graphics and tables that are non-character elements are extracted particularly excellently in the image of FIG. 6 if compared with FIG. 4.

Then, the reversing section 41 reverses the luminance of the binary image for extracting non-character elements and generates a reversal binary image. The reversal binary image shows patterns such as frame lines in white and background regions of the frame lines in black. When the embodiment performs a layout analysis on a color image, the reversing section 41 delivers the reversal binary image to the rectangular divided region extracting section 52.

Figure 7:
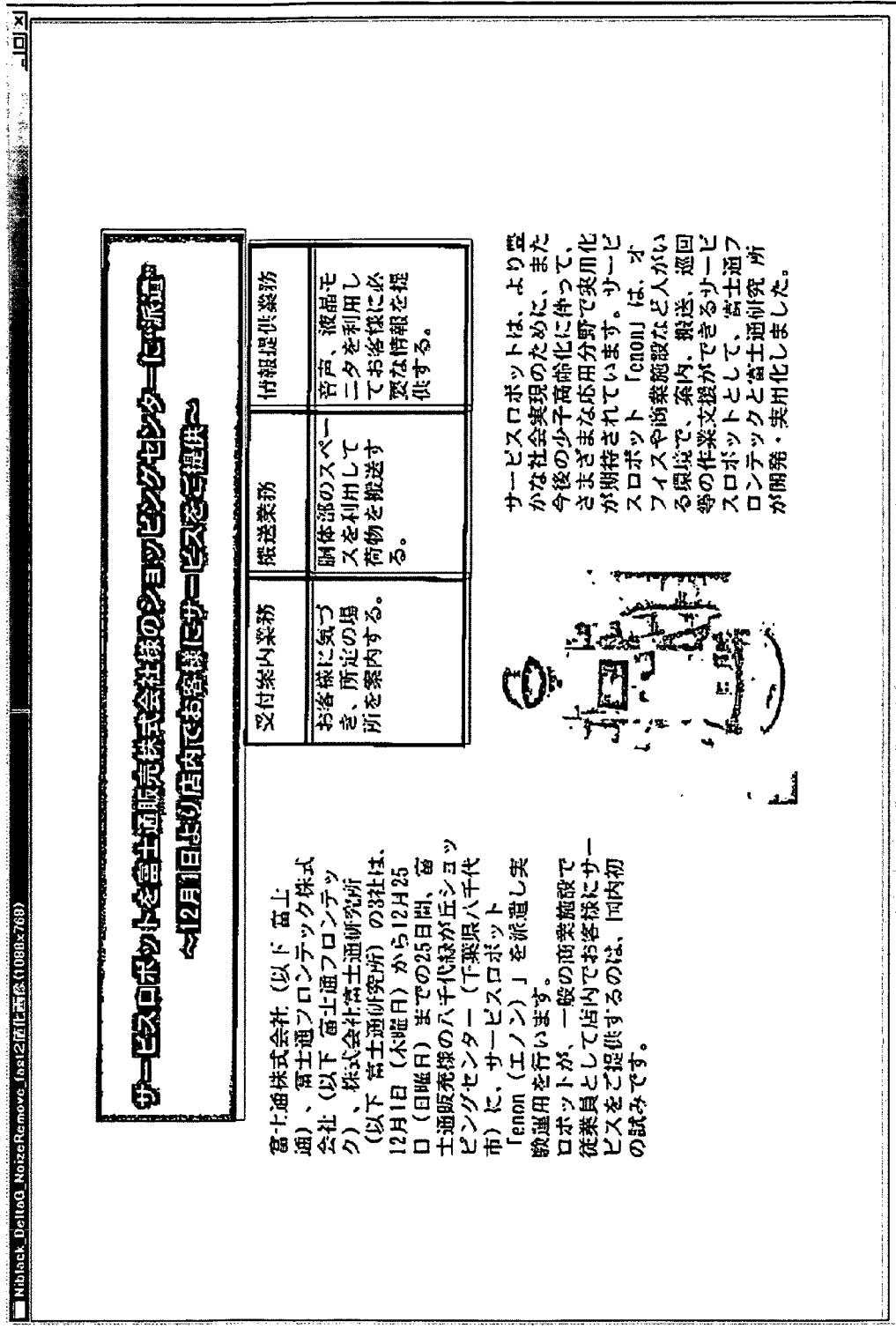
FIG. 7 is a schematic illustration of an image produced as output by the rectangular divided region extracting section 52 of the embodiment of FIG. 1.

Thereafter, the rectangular divided region extracting section 52 extracts black pixels linking regions by labeling the black pixels of the reversed binary image, extracts rectangles circumscribing about the extracted black pixels linking regions and selects the circumscribed rectangles larger than a predetermined size as rectangular divided regions. Regions that are partitioned by patterns such as frame lines are extracted as rectangular divided regions as a result of using a reversal binary image. The entire binary image for extracting non-character elements may become a rectangular divided region. FIG. 7 is a schematic illustration of an image that can be produced as output by the rectangular divided region extracting section 52 of this embodiment. It will be appreciated that frame lines and tables are extracted as rectangular divided regions in the image.

Subsequently, the independent divided region extracting section 53 extracts the relation of inclusion of the rectangular divided regions and also independent divided regions that are independent parts from the rectangular divided regions. In other words, the region obtained by removing the rectangular divided region included in a rectangular divided region from the rectangular divided region is used as independent divided region. Therefore, independent divided regions do not overlap each other. FIG. 8 is a schematic illustration of an image, showing the operation of the independent divided region extracting section 53 of this embodiment. The independent divided region extracting section 53 extracts independent divided regions 0 through 5 from the rectangular divided regions 0 through 5 in FIG. 8.

independent divided region 0

=region obtained by removing rectangular divided regions 1 and 3 from rectangular divided region 0 independent divided region 1

=region obtained by removing rectangular divided region 2 from rectangular divided region 1 independent divided region 2

=rectangular divided region 2 independent divided region 3

=region obtained by removing rectangular divided regions 4 and 5 from rectangular divided region 3 independent divided region 4

=rectangular divided region 4 independent divided region 5

=rectangular divided region 5

For example, the independent divided region 0 is a region located inside the rectangular divided region 0 and outside the rectangular divided regions 1 and 3.

The intra-non-character-element character element extracting section 61 extracts the character elements extracted by the binary image layout analyzing section 33 (from the binary image for extracting non-character elements) in the non-character elements extracted by the binary image layout analyzing section 23 (from the binary image for extracting character elements).

Figure 9:
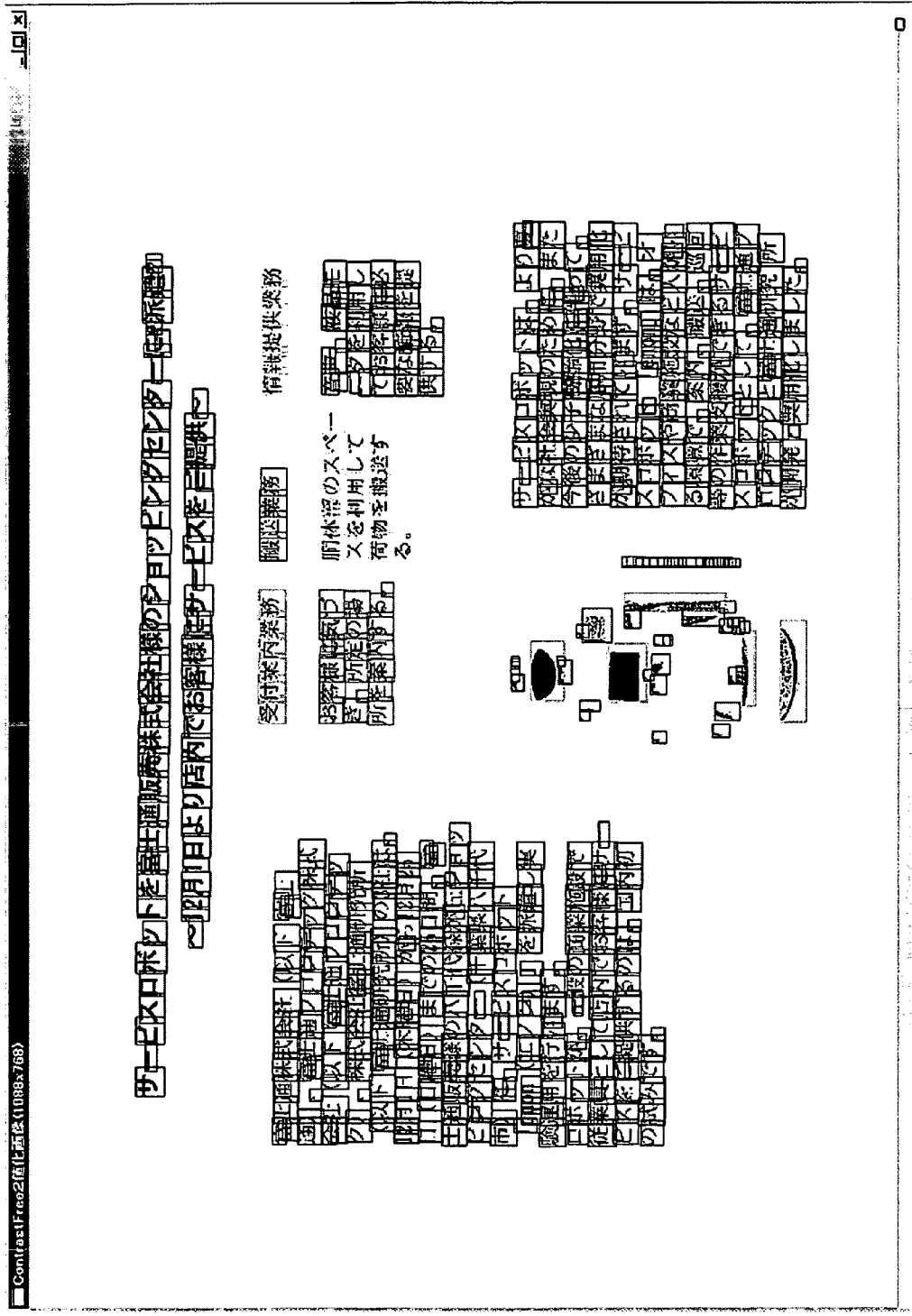
FIG. 9 is a schematic illustration of an image produced as output by the set of character elements extracting section 62 of the embodiment of FIG. 1.

Thereafter, the set of character elements extracting section 62 extracts sets of character elements included in each of the independent divided regions out of the character elements extracted by the binary image layout analyzing section 23 (from the binary image for extracting character elements) and uses them as sets of character elements. The set of character elements extracting section 62 additionally includes the character elements in each of the independent divided regions in the corresponding set of character elements out of the character elements extracted by the intra-non-character-element character element extracting section 61. FIG. 9 is a schematic illustration of an image that can be produced as output by the set of character elements extracting section 62 of this embodiment. It will be appreciated that the character elements of FIG. 4 are recognized as sets of character elements divided for each of the independent divided regions.

Figure 10:
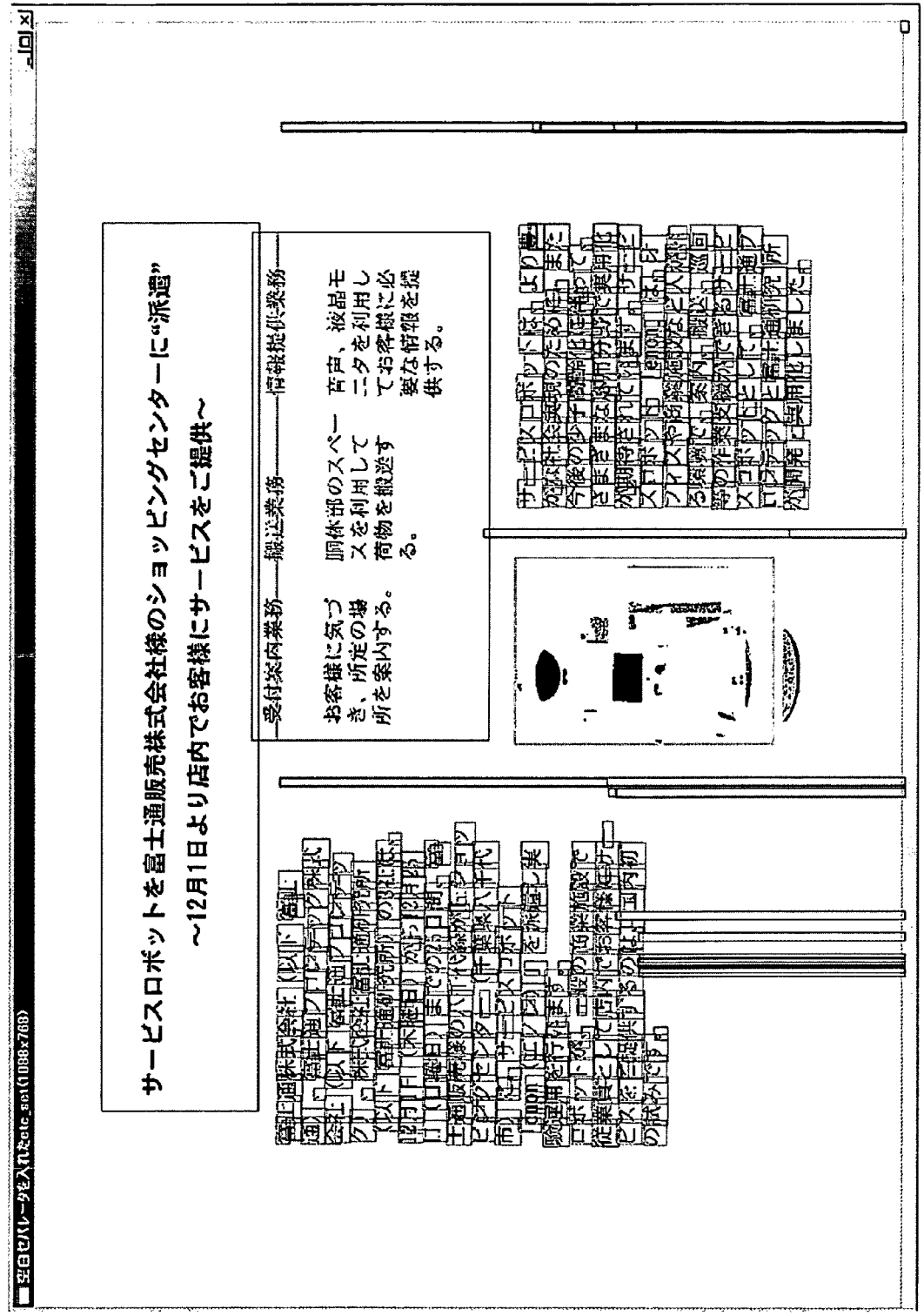
FIG. 10 is a schematic illustration of an image produced as output by the blank separator extracting section 63 of the embodiment of FIG. 1.

Then, the blank separator extracting section 63 generates an image that fills each of the independent divided regions with white pixels and draws the sets of character elements generated by the set of character elements extracting section 62 onto the white pixels with black pixels and additionally draws the non-character elements extracted by the binary image layout analyzing section 33 (from the binary image for extracting non-character elements) with black pixels. Thereafter, the blank separator extracting section 63 extracts longitudinally oblong white regions larger than a predetermined size and also the longitudinal centerlines of the extracted white regions as virtual blank separators. FIG. 10 is a schematic illustration of an image that can be produced as output by the blank separator extracting section 63 of this embodiment. It will be appreciated that blank separators are extracted as longitudinally oblong rectangles. In this embodiment, the predetermined size is defined longitudinally by 2,000 pixels and transversally 75 pixels. As the blank separator extracting section 63 extracts blank separators, it is possible to accurately separate the text blocks that are separated by blanks in the independent divided regions.

Subsequently, the text block extracting section 64 extracts text blocks by means of the sets of character elements extracted by the set of character elements extracting section 62, the non-character elements extracted by the binary image layout analyzing section 33 (from the binary image for extracting non-character elements) and the blank separators extracted by the blank separator extracting section 63. The text block extracting section 64 extracts rectangles formed by collecting sets of character elements so as not to overlap them on rectangles of non-character elements and blank separators and uses them as text blocks. This process can be executed by using the above described technique for binary image layout analysis processes.

Figure 11:
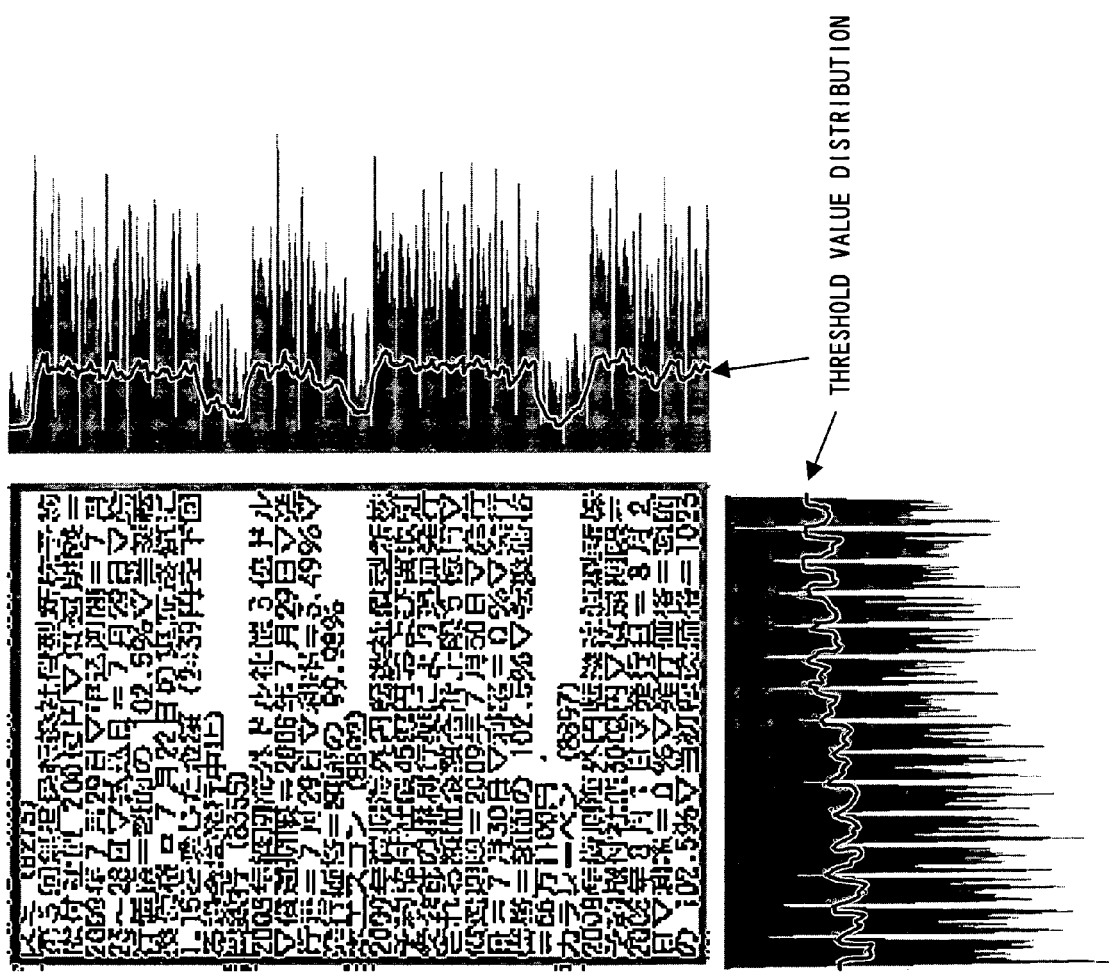
FIG. 11 is a schematic illustration of an image, showing the operation of the text block converting section 65 of the embodiment of FIG. 1.

Then, the text block converting section 65 converts the non-character elements that satisfy predetermined requirements and that are selected out of the non-character elements extracted by the binary image layout analyzing section 33 (from the binary image for extracting non-character elements). FIG. 11 is a schematic illustration of an image, showing the operation of the text block converting section 63 of this embodiment. FIG. 11 shows a binary image of the non-character elements extracted by the binary image layout analyzing section 33 (from the binary image for extracting non-character elements) as well as a black pixel number distribution pattern and a threshold value distribution pattern in a longitudinal direction, which are illustrated at the right side of the binary image and will be described in greater detail hereinafter, and a black pixel number distribution pattern and a threshold value distribution pattern in a transversal direction, which are illustrated under the binary image and will be described in greater detail hereinafter.

Firstly, the text block converting section 65 computationally determines the black pixel number distribution in a longitudinal direction in each region of non-character elements extracted by the binary image layout analyzing section 33 (from the binary image for extracting non-character elements) by counting the number of black pixels for each vertical coordinate value. Similarly, the text block converting section 65 computationally determines the black pixel member distribution in a transversal direction by counting the number of black pixels for each horizontal coordinate value. Then, the text block converting section 65 determines the moving average of the black pixel number distributions in the longitudinal direction, multiplies the obtained value by 0.5 to determine the black pixel number threshold value distribution in the longitudinal direction. Similarly, the text block converting section 65 determines the black pixel number threshold value distribution in the transversal direction from the black pixel number distributions in the transversal direction. In this embodiment, the window size of moving average is made equal to 21 pixels.

Then, the text block converting section 65 compares the black pixel number distribution and the black pixel number threshold value distribution for each vertical coordinate value and selects the coordinate value where the value of the black pixel number distribution exceeds the black pixel number threshold value distribution as black determining coordinate value for the longitudinal direction. Similarly, the text block converting section 65 selects black determining coordinate value for the transversal direction from the black pixel number distribution and the black pixel number threshold value distribution for each horizontal coordinate value. Thereafter, the text block converting section 65 computationally determines the histogram of the widths of consecutive black determining coordinate values in the longitudinal direction as consecutive black determining width histogram in the longitudinal direction. Similarly, the text block converting section 65 computationally determines a consecutive black determining width histogram in the transversal direction from the black determining coordinate values in the transversal direction.

Then, the text block converting section 65 computationally determines the value of the width of the mode in the consecutive black determining width histogram in the longitudinal direction and adds the frequency of the width of the mode and that of the width adjacent to the width of the mode to use the sum as the frequency at and near the mode in the longitudinal direction. Similarly, the text block converting section 65 computationally determines the frequency at and near the mode in the transversal direction from the consecutive black determining width histogram in the transversal direction. Thereafter, the text block converting section 65 computationally determines (the frequency at and near the mode in the longitudinal direction/the mode in the longitudinal direction) as the concentration ratio at and near the mode in the longitudinal direction. Similarly, the text block converting section 65 computationally determines (the frequency at and near the mode in the transversal direction/the mode in the transversal direction) as the concentration ratio at and near the mode in the transversal direction.

The non-character elements being analyzed are judged to be satisfying predetermined requirements when either the concentration ratio in the longitudinal direction or the concentration ratio in the transversal direction exceeds a predetermined concentration ratio threshold value. In other words, the non-character elements where black pixels are distributed for a predetermined width in the longitudinal direction or in the transversal direction can be regarded as text block.

Figure 12:
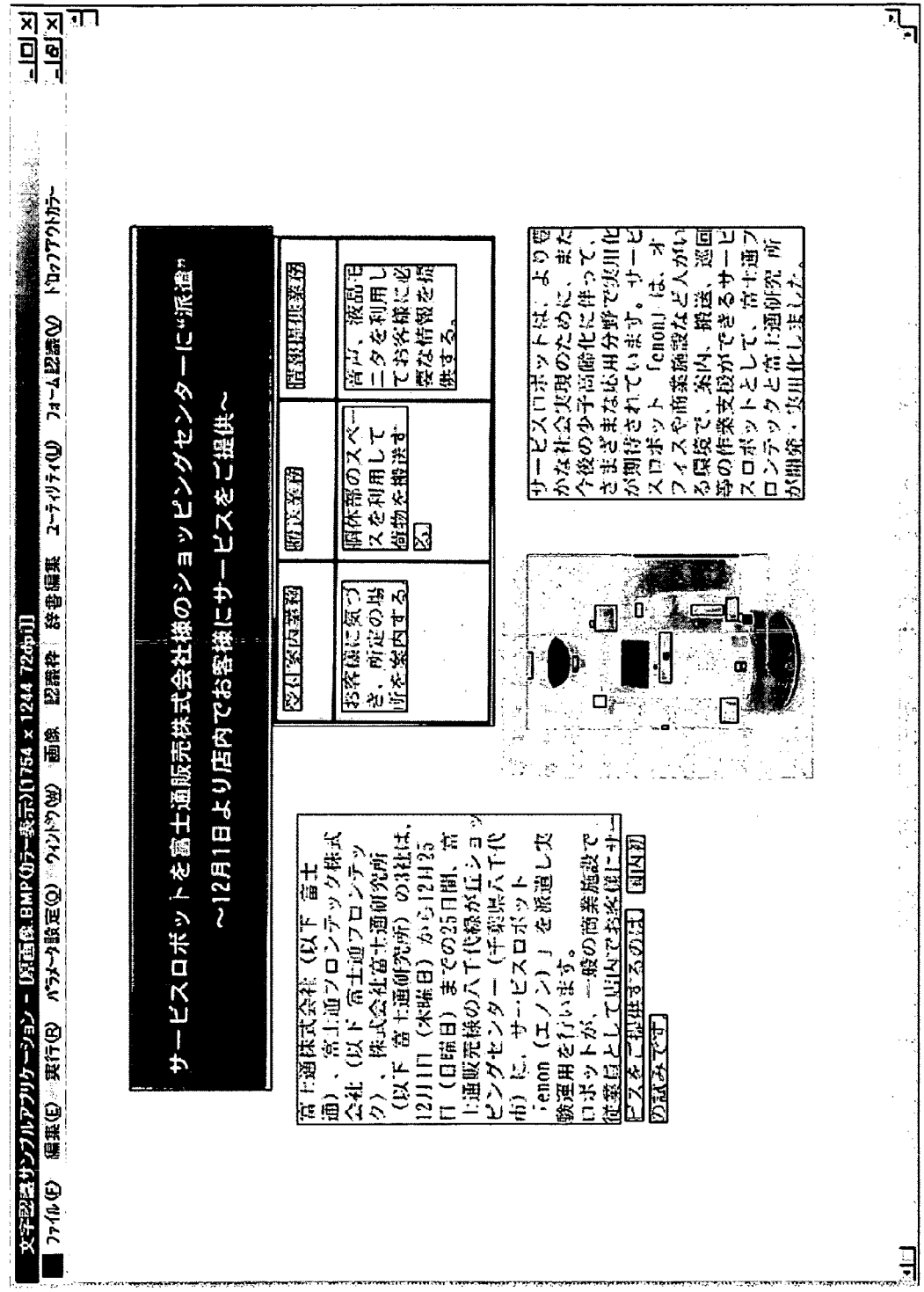
FIG. 12 is a schematic illustration of an image produced as output by the layout information generating section 66 of the embodiment of FIG. 1.

Thereafter, the layout information generating section 66 puts the text blocks extracted by the text block extracting section 64, the text blocks extracted by the text block converting section 65 and the non-character elements extracted by the binary image layout analyzing section 33 (from the binary image for extracting non-character elements) together regardless of repetitions and outputs them as layout information to end the layout analysis of the color image. FIG. 12 is a schematic illustration of an image that can be produced as output by the layout information generating section 66 of this embodiment. In the image, sets of character elements are put together and extracted as rectangular text blocks. As pointed out above, with this embodiment, it is possible to highly accurately extract text blocks from a color image by combining the elements extracted by the binarizing section for extracting character elements 21 and the binarizing section for extracting non-character elements 31, exploiting their respective advantages.

Now, a specific example of evaluation of a layout analysis apparatus will be described below.

The evaluation was conducted by observing the character acquisition ratio and the separation ratio. The character acquisition ratio and the separation ratio are computationally determined by comparing the correct answer data prepared in advance and the outcome of the layout analysis.

Figure 13:
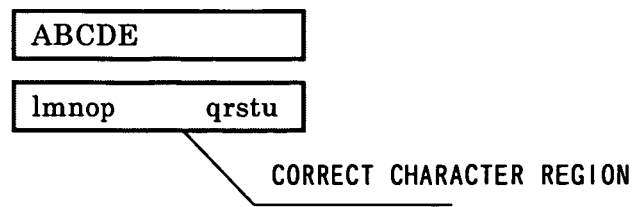
FIG. 13 is a schematic illustration of a correct character region that can be used for evaluation by the embodiment of FIG. 1.
Figure 14:
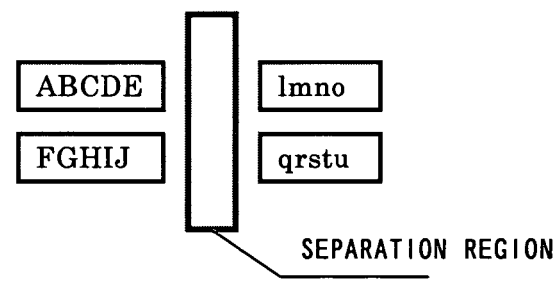
FIG. 14 is a schematic illustration of a separation region that can be used for evaluation by the embodiment of FIG. 1.
Figure 15:
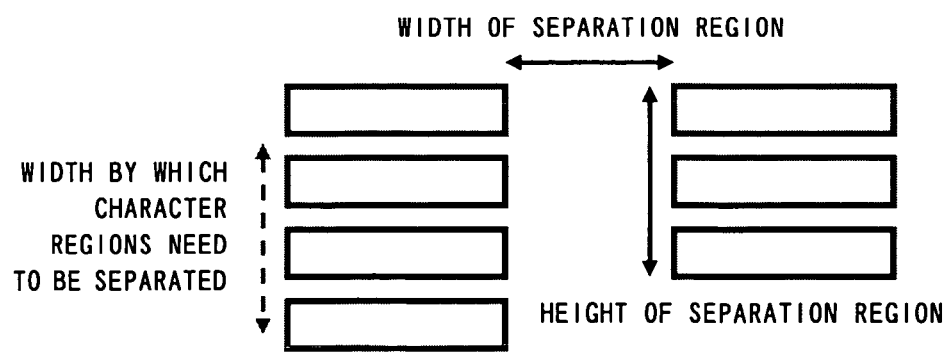
FIG. 15 is a schematic illustration of the size of a separation region that can be used for evaluation by the embodiment of FIG. 1.

The region enclosed by a square as a region that the layout analysis apparatus has to recognize as character in the sample data is defined as correct character region for the correct answer data. FIG. 13 is a schematic illustration of a correct character region that can be used for evaluation by this embodiment. A similar process is executed for graphics and tables so as to evaluate them as correct graphic regions and correct table regions if appropriate. Correct answer data are generated for each line of character string. It is not desirable for the layout analysis apparatus to misrecognize correct character regions that need to be separated as a line. Therefore, a separation region is provided at a place where correct character regions need to be recognized separately and, if a recognized region extends beyond a separation region, a demerit mark is given for the evaluation. FIG. 14 is a schematic illustration of a separation region that can be used for evaluation by this embodiment. The largest value of the gaps separating the regions to be separated is selected as the width of the separation region. The height of the separation region is made equal to the height of the regions to be separated. FIG. 15 is a schematic illustration of the size of a separation region that can be used for evaluation by this embodiment.

The acquisition ratio is an index for showing the extent to which the recognized regions output by the layout analysis apparatus correspond to correct regions. The acquisition ratio is determined by computing the ratio to which the recognized regions of characters, graphics and tables output by the layout analysis apparatus correspond to correct regions. The character acquisition ratio is computed by means of the formula shown below.

character acquisition ratio={(approximate number of characters contained in the character regions output by the layout analysis apparatus)−(demerit marks for unnecessary divisions of character regions)}/(approximate number of all the correct characters)

The approximate number of characters is computed by predicting the size of each character from the width and the height of each correct region. When a character region to be recognized as a region is unnecessarily divided, a demerit mark same as the one given to misacquisition of four characters is given to it. A margin is provided to the computation of acquisition ratio. As for the character acquisition ratio, the margin is defined as the height multiplied by a predetermined coefficient when the correct character region is for horizontal writing. Then, the region recognized according to the output of layout analysis is expanded by the length of the margin and the region is authorized as correct region when a correct character region is included in the expanded region. On the other hand, the margin is defined as the width multiplied by a predetermined coefficient when the correct character region is for vertical writing. In this evaluation system, the coefficient is defined as 50%.

The separation ratio is an index for showing the extent to which the layout analysis apparatus correctly recognizes separate character strings. A separation ratio is applied only to character regions and not applied to graphic regions and table regions if they extend beyond a separation region. When the recognized region output by the layout analysis apparatus extends beyond a separation region, it is judged that the apparatus could not accurately recognize the region to be separated and committed a mistake. The width of a separation region is defined as margin of separation. When recognized regions overlap each other but do not extend beyond a separation region, they are within the tolerance range and regarded as correct regions. The separation ratio is computed by means of the formula shown below.

Separation ratio=1−((length of the character region that extends beyond the separation region and that is out of the character regions output by the layout analysis apparatus)/(length of the separation region)).

Figure 16:
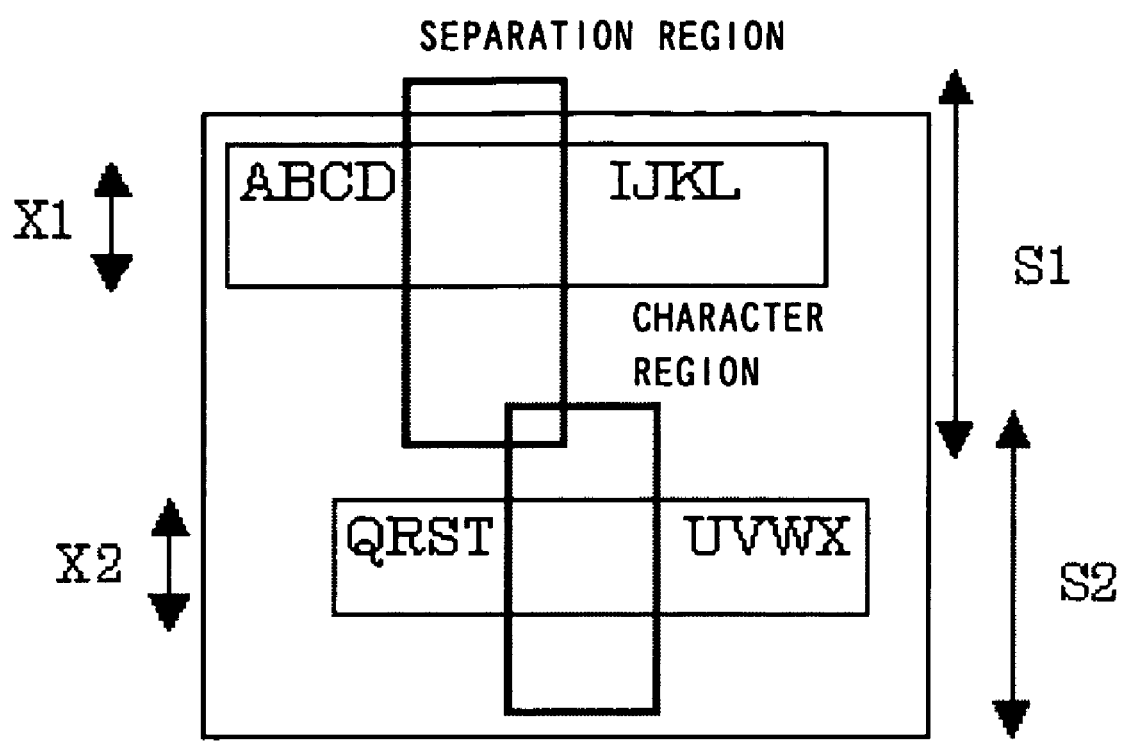
FIG. 16 is a schematic illustration of the computation of the separation ratio of an image that can be used for evaluation by the embodiment of FIG. 1.
Figure 17:
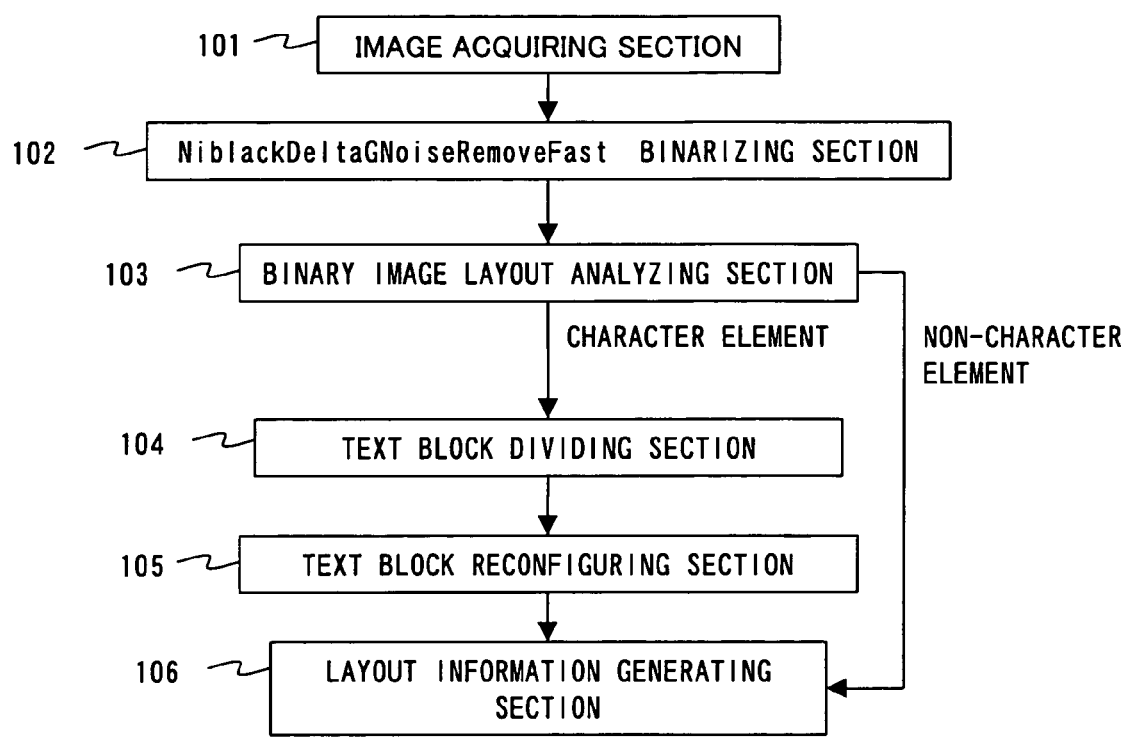
FIG. 17 is a schematic block diagram of a known layout analysis apparatus for a color image.

FIG. 16 is a schematic illustration of the computation of the separation ratio of an image that can be used for evaluation by the embodiment. The separation ratio in this example is computed by means of the formula shown below.

separation ratio=1−((X1+X2)/(S1+S2)), where X1 and X2 represent the heights of character regions and S1 and S2 represent the height of the separation regions that correspond to the respective character regions. In short, the ratio of the long sides of the regions is computed.

The objects that were analyzed and evaluated by this embodiment include color document images of sixty three different types. They include catalogs (of six different type), comics (of five different types), evaluator images for JEITA (Japan Electronics and Information Technology Industries Association) printers (of seventeen different types), magazines (of six different types), newspapers (of eight different types), office documents (internal reports) (of five different types), pamphlets (of five different types), pages for presentation (of five different types) and papers (of six different types). The above-documents were scanned by using 24-bit colors and 150 dpi to produce color images for evaluation.

The character acquisition ratios and the separation ratios computed by using the above listed formulas were not used directly. In other words, the results of the computations were weighted with the values listed below by considering the probability of appearance of each of the types of the documents to be evaluated, the numbers of characters expected to be found in documents of the types of the documents to be evaluated and other factors.

catalog=3,440 comic=1,800 evaluator image for JEITA printer=10,796 magazine=7,475 newspaper=4,530 office document (internal report)=14,634 pamphlet=3,514 page for presentation=2,463 paper=16,318

Firstly, the average value of the images of each of the types was computed and weighted to determine the weighted average, which was used as final value.

As a result of the above described evaluation procedure, the character acquisition ratio and the separation ratio of this embodiment of layout analysis apparatus were found to be 96.89% and 96.82% respectively to prove the effectiveness of the present invention if compared with the character acquisition ratio and the separation ratio of the above described known layout analysis apparatus, which are 90.92% and 95.18% respectively.

Now, the operation of the layout analysis apparatus of this embodiment for analyzing the layout of a binary image will be described below.

When analyzing the layout of a binary image, the image acquiring section 11 delivers the binary image to the resolution adjusting section 22 and the resolution adjusting section 32. The two resolution adjusting sections 22 and 32 operate like they do when analyzing the layout of a color image, which is described above. More specifically, when analyzing the layout of a binary image, the reversing section 41 delivers a reversed binary image to the rectangle deleting section 42. The rectangle deleting section 42 extracts black pixel linking regions by labeling the reversed binary image, extracts rectangles circumscribing about the extracted black pixels linking regions, deletes the extracted rectangle having the largest area from the reversed binary image and delivers the obtained reversed binary image to the rectangular divided region extracting section 52 and the binary image layout analyzing section 33. The subsequent process is same as that of the above described layout analysis for a color image.

As a result of the above-described process, the layout analysis apparatus of this embodiment can highly accurately extract text blocks from a binary image.

The above-described layout analysis apparatus of this embodiment can be applied to an OCR apparatus with ease to improve the performance of the OCR apparatus. An OCR apparatus may be an information processing apparatus or a scanner.

The present invention also provides a layout analysis program for causing the computer of the layout analysis apparatus to execute the above described steps. The program can be executed by the computer of the layout analysis apparatus when it is stored in a recording medium that the computer can read. Recording mediums that the computer can read include internal storage mediums that can be mounted in the computer such as ROMs and RAMs, portable type storage mediums such as CD-ROMs, flexible disks, DVD disks, magneto-optical disks and IC cards, data bases holding the program, other computers and their data bases.

Note that the divided region extracting step and the divided region extracting section correspond to the reversing section 41, the rectangle deleting section 42, the rectangular divided region extracting section 52 and the independent divided region extracting section 53 of this embodiment. The set of character elements extracting step and the set of character elements extracting section correspond to the intra-non-character-element character element extracting section 61 and the set of character elements extracting section 62 of this embodiment. The text block extracting step and the text block extracting section correspond to the blank separator extracting section 63, the text block extracting section 64 and the text block converting section 65 of this embodiment. The layout information generating step and the layout information generating section correspond to the layout information generating section 66 of this embodiment.

The first binary image layout analysis process corresponds to the binary image layout analyzing section 22 of this embodiment. The second binary image layout analysis process corresponds to the binary image layout analyzing section 32 of this embodiment. The first binarization process corresponds to the binarizing section for extracting character elements 21 of this embodiment. The second binarization process corresponds to the binarizing section for extracting non-character elements 31. A divided region corresponds to an independent divided region of this embodiment.

What is claimed is:

1. A computer-readable recording medium having a layout analysis program recorded thereon, said program causing a computer to perform the steps which comprise:
    a divided region extracting step that extracts a region partitioned by a pattern according to a binary image so as to use the outcome of extraction as divided region;
    a set of character elements extracting step that extracts a set of the character elements extracted by a first binary image layout analysis process for each divided region extracted in the divided region extracting step so as to use the outcome of extraction as set of character elements;
    a text block extracting step that extracts a region including the set of character elements extracted in the set of character elements extracting step in each divided region so as to avoid overlapping the non-character elements extracted by a second binary image layout analysis process and use the outcome of extraction as text block; and
    a layout information generating step that generates layout information according to the text block extracted in the text block extracting step and the non-character elements extracted by the second binary image layout analysis process.

2. The computer-readable recording medium according to claim 1, wherein
    the set of character elements extracting step is adapted to additionally include the character elements included in the non-character elements extracted by the first binary image layout analysis process out of the character elements extracted by the second binary image layout analysis process in the set of character elements.

3. The computer-readable recording medium according to claim 1, wherein
    the text block extracting step is adapted to additionally extract a separator in each divided regions extracted in the divided region extracting step and then a region including the set of character elements extracted in the set of character elements extracting step in each divided region so as to avoid overlapping the separator and non-character elements extracted by the second binary image layout analysis process and use the outcome of extraction as text block.

4. The computer-readable recording medium according to claim 1, wherein
    the text block extracting step is adapted to additionally use the non-character elements as text block when it determines that the non-character elements extracted by the first binary image layout analysis process constitute a text block.

5. The computer-readable recording medium according to claim 4, wherein
    the text block extracting step is adapted to additionally determine if the non-character elements constitute a text block or not according to the periodicity of the vertical distribution of black pixels and the periodicity of the horizontal distribution of black pixels of the non-character elements extracted by the first binary image layout analysis process.

6. The computer-readable recording medium according to claim 1, wherein
    the first binary image layout analysis process shows a higher accuracy level for extraction of character elements than the second binary image layout analysis process.

7. The computer-readable recording medium according to claim 1, wherein
    the first binary image layout analysis process is for executing a first binarization process on an original image that is a color image and performing a layout analysis on the first binary image obtained by the binarization process, and
    the second binary image layout analysis process is for executing a second binarization process that is different from the first binarization process on the original image and performing a layout analysis on the second binary image obtained by the binarization process while
    the divided region extracting step is adapted to extract a divided region according to the second binary image.

8. The computer-readable recording medium according to claim 7, wherein
    the divided region extracting step is adapted to reverse the luminance of the second binary image, extract a region of linked black pixels from the reversed binary image obtained by the reversal and then rectangles circumscribing the region, select a rectangle satisfying predetermined requirements from the rectangles as rectangular divided region and use the region obtained by removing the rectangular divided region included in a rectangular divided region from the rectangular divided region as the divided region.

9. The computer-readable recording medium according to claim 1, wherein
    the first binary image layout analysis process is for performing a layout analysis on the original image that is a binary image, and
    the second binary image layout analysis process is for reversing the luminance of the original image and performing a layout analysis on the reversed binary image obtained by the reversal while
    the divided region extracting step is adapted to extract the divided region according to the reversed binary image.

10. The computer-readable recording medium according to claim 9, wherein
    the divided region extracting step is adapted to extract a region of linked black pixels from the reversed binary image obtained and then rectangles circumscribing the region, select a rectangle satisfying predetermined requirements from the rectangles as rectangular divided region and use the region obtained by removing the rectangular divided region included in a rectangular divided region from the rectangular divided region as the divided region.

11. The computer-readable recording medium according to claim 1, wherein
the character elements are character rectangles.

12. A layout analysis apparatus for analyzing the layout of an image, the apparatus comprising:
a divided region extracting section that extracts a region partitioned by a pattern according to a binary image so as to use the outcome of extraction as divided region;
a set of character elements extracting section that extracts a set of the character elements extracted by a first binary image layout analysis process for each divided region extracted by the divided region extracting section so as to use the outcome of extraction as set of character elements;
a text block extracting section that extracts a region including the set of character elements extracted by the set of character elements extracting section in each divided region so as to avoid overlapping the non-character elements extracted by a second binary image layout analysis process and use the outcome of extraction as text block; and
a layout information generating section that generates layout information according to the text block extracted by the text block extracting section and the non-character elements extracted by the second binary image layout analysis process.

13. The apparatus according to claim 12, wherein
the set of character elements extracting section is adapted to additionally include the character elements included in the non-character elements extracted by the first binary image layout analysis process out of the character elements extracted by the second binary image layout analysis process in the set of character elements.

14. The apparatus according to claim 12, wherein
the text block extracting section is adapted to additionally extract a separator in each divided regions extracted by the divided region extracting section and then a region including the set of character elements extracted by the set of character elements extracting section in each divided region so as to avoid overlapping the separator and non-character elements extracted by the second binary image layout analysis process and use the outcome of extraction as text block.

15. The apparatus according to claim 12, wherein
the text block extracting section is adapted to additionally use the non-character elements as text block when it determines that the non-character elements extracted by the first binary image layout analysis process constitute a text block.

16. The apparatus according to claim 15, wherein
the text block extracting section is adapted to additionally determine if the non-character elements constitute a text block or not according to the periodicity of the vertical distribution of black pixels and the periodicity of the horizontal distribution of black pixels of the non-character elements extracted by the first binary image layout analysis process.

17. The apparatus according to claim 12, wherein
the first binary image layout analysis process shows a higher accuracy level for extraction of character elements than the second binary image layout analysis process.

18. The apparatus according to claim 12, wherein
the first binary image layout analysis process is for executing a first binarization process on an original image that is a color image and performing a layout analysis on the first binary image obtained by the binarization process, and
the second binary image layout analysis process is for executing a second binarization process that is different from the first binarization process on the original image and performing a layout analysis on the second binary image obtained by the binarization process while
the divided region extracting section is adapted to extract a divided region according to the second binary image.

19. A layout analysis method for analyzing the layout of an image, the method comprising:
using a computer to perform the steps of:
a divided region extracting step that extracts a region partitioned by a pattern according to a binary image so as to use the outcome of extraction as divided region;
a set of character elements extracting step that extracts a set of the character elements extracted by a first binary image layout analysis process for each divided region extracted in the divided region extracting step so as to use the outcome of extraction as set of character elements;
a text block extracting step that extracts a region including the set of character elements extracted in the set of character elements extracting step in each divided region so as to avoid overlapping the non-character elements extracted by a second binary image layout analysis process and use the outcome of extraction as text block; and
a layout information generating step that generates layout information according to the text block extracted in the text block extracting step and the non-character elements extracted by the second binary image layout analysis process.

* * * * *